United States Patent
Ye et al.

(10) Patent No.: US 6,573,357 B1
(45) Date of Patent: Jun. 3, 2003

(54) PROCESS FOR THE PREPARATION OF KETIMINE CURING AGENTS

(75) Inventors: Jenny Qinhong Ye, Sugar Land, TX (US); Michael Earl Beasley, Houston, TX (US)

(73) Assignee: Resolution Performance Products LLC, Houston, TX (US)

( * ) Notice: Subject to any disclaimer, the term of this patent is extended or adjusted under 35 U.S.C. 154(b) by 18 days.

(21) Appl. No.: 09/602,398

(22) Filed: Jun. 23, 2000

Related U.S. Application Data

(60) Provisional application No. 60/141,774, filed on Jun. 30, 1999.

(51) Int. Cl.[7] .............................................. C08G 12/00
(52) U.S. Cl. ........................ 528/229; 528/228; 528/422; 528/503
(58) Field of Search ................................. 528/229, 228, 528/422, 503

(56) References Cited

U.S. PATENT DOCUMENTS

| | | |
|---|---|---|
| 3,322,797 A | 5/1967 | Holm |
| 3,484,408 A | 12/1969 | Holm |
| 3,553,118 A | 1/1971 | Brizgys |
| 3,821,302 A | 6/1974 | Hu |
| 4,495,335 A | 1/1985 | Geist et al. |
| 4,547,409 A | 10/1985 | Geist et al. |
| 4,832,748 A | 5/1989 | Tawara et al. |

FOREIGN PATENT DOCUMENTS

EP 0 796 903 B1 9/1997

OTHER PUBLICATIONS

Tran et al, "Synthesis and appliaction of ketmine for curing of epoxy resins at high relative humidity", 1996, Chem Abstract 126: 212808.*
Moss et al, "Preparation and properties of some cyclic beta–diketone diimines", 1973, Chem Abstract 78: 124105.*
Mengler et al., "1, 1,6,6–tetraisopropyl–2,5–diaza–1, 5–hexadiene", 1972, Chem Abstract 77: 33908.*

* cited by examiner

Primary Examiner—Duc Truong
(74) Attorney, Agent, or Firm—Lisa Kimes Jones

(57) ABSTRACT

The present invention relates to a process for the production of aliphatic ketimines having a polyalkylenepolyamine content of less than 1% by weight from the corresponding aliphatic ketones and polyalkylenepolyamines comprising the steps of: (a) forming a mixture of said aliphatic ketones and said polyalkylenepolyamines wherein the weight ratio of said ketone to said polyalkylenepolyamine is in the range of about 3.0:1 to about 10:1; (b) heating said mixture to a refluxing temperature between about 170° F. and 230° F. while continuously removing water to form the corresponding aliphatic ketimine; and (c) isolating said aliphatic ketimine.

23 Claims, 1 Drawing Sheet

PROCESS FOR THE PREPARATION OF KETIMINE CURING AGENTS

Figure 1:
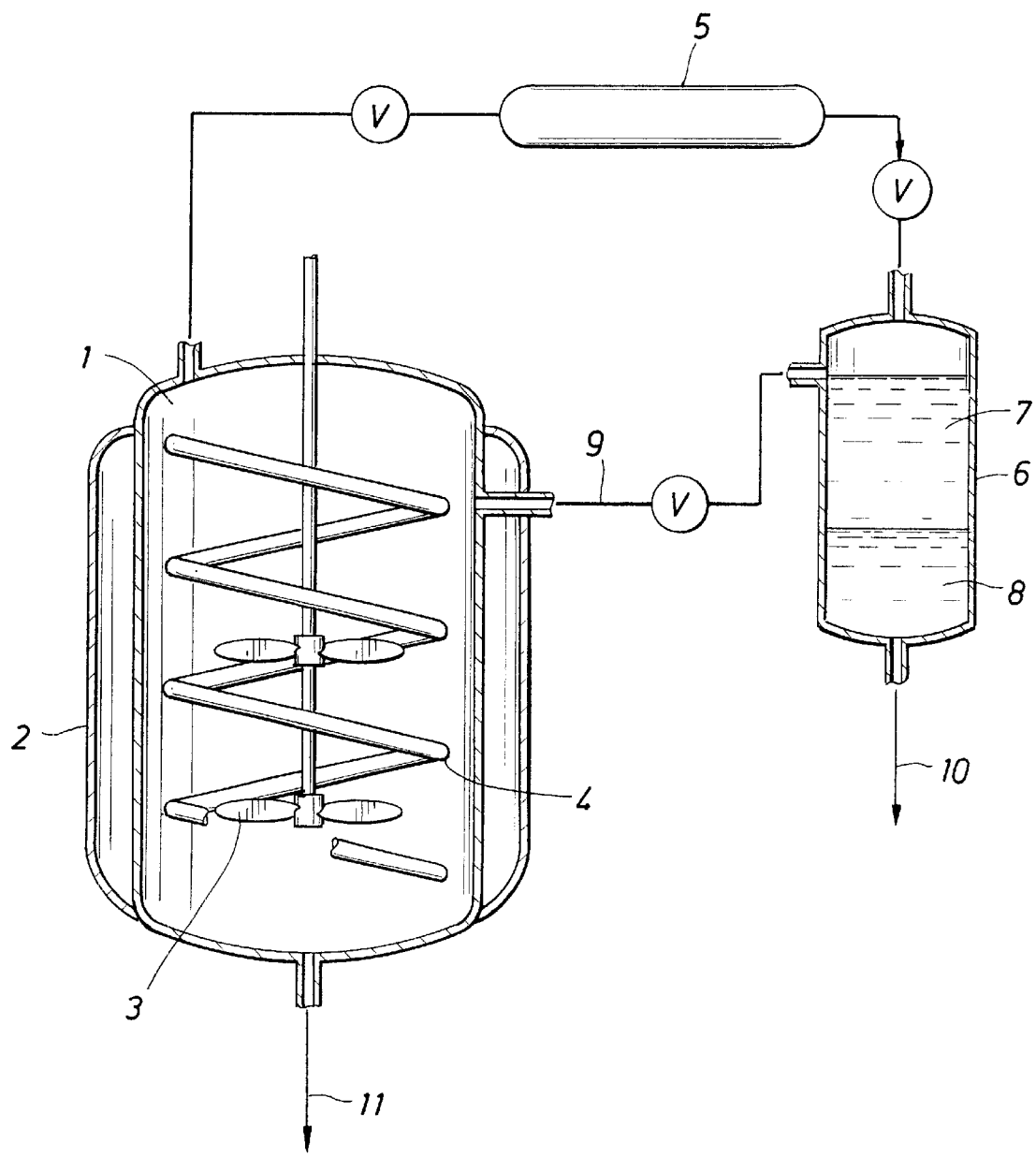

This application claims the benefit of U.S. Provisional Application No. 60/141,774 filed Jun. 30, 1999, the entire disclosure of which is hereby incorporated by reference.

FIELD OF THE INVENTION

The present invention relates to an improved process for the preparation of ketimines. More specifically, this invention relates to processes for the production of ketimines having a higher level of purity. This invention also relates to the production of a ketimine-curing agent prepared by reacting a polyalkylene polyamine with methyl isobutyl ketone. The ketimines of the present invention having higher levels of purity are useful as curing agents and cross-linking agents for resins such as epoxy resins. This invention also relates to improvements in the production of ketimines by using specific weight ratios of reactants. The present invention also relates to the production of higher purity ketimine curing agents by careful control of reaction temperature. The invention is further directed to a process for the production of aliphatic ketimines having an unreacted polyalkylenepolyamine content of less than 1% by weight.

BACKGROUND OF THE INVENTION

The invention relates to curing agents and cross-linking agents comprising a mono- or difunctional, one or more secondary amino groups-containing ketimines. Such curing agents are applied in bicomponent compositions curable under the influence of moisture and used for coating, impregnating, sealing and bonding purposes, on the basis of resins containing functional groups such as anhydride, epoxy, isocyanate, acetoacetate and $\alpha,\beta$-ethylenically unsaturated carbonyl. The hydrolysis under the influence of moisture is attended with the release of a ketone, which can evaporate from the composition, and the formation of a primary amino group, which may enter into a cross-linking or curing reaction with the functional resins. Another application is to apply the ketimine curing agent under dried conditions and used for coatings or bonding purposes. The secondary amine functional groups of the Ketimine may enter into a cross-linking or curing reaction with functional resins, such as epoxy resins.

Ketimines derived from a variety of ketones and polyamines are described in U.S. Pat. No. 3,322,797. The '797 patent describes the process for making the ketimine by reacting the polyamine with the ketone under refluxing conditions. The '797 patent does not describe the importance of temperature and weight ratio of reactants in achieving a product having less than 1% free amine or unreacted polyamine content and less than 6% of other impurities including the tri-substituted species (trimers).

It is also known that in some cases the use of these low molecular weight ketimines gives rise to problems as far as toxicity, carbonization tendency and poor performance of the cured products. In those cases it is preferred that the molecular weight of the mono- or difunctional ketimine be increased by the addition to the secondary amino group(s) of one or more compounds reactive with the secondary amino group. Such "oligomeric" ketimines having a medium molecular weight, usually in the range of 300 to 3000, are described in, int. al., U.S. Pat. Nos. 3,975,251, 4,251,597, 4,503,174 and 4,504,630, the descriptions of which are herein incorporated by reference.

It is also known that the colour or at least the colour stability of the well-known curing agents is generally not quite satisfactory. Often the product is found to discolour during its preparation, while in other cases the products appear to discolour during storage. This is objectionable if they are to be used in compositions for which the colour is of essential importance, as with colourless coatings in, e.g., a 2-layer metallics system. The present invention provides ketimine curing agents and cross-linking agents, which are of higher purity and moreover display excellent colour and shelf stability.

Ketimines have been found to be particularly useful latent curing agents especially for polyepoxides where extending the potlife is desirable. The ketimines are relatively inert when mixed with polyepoxides, but when the mixture is exposed to a moist atmosphere they become highly reactive toward the polyepoxide and the mixture sets up to form a hard cured product. The purity of the ketimine plays a role in the pot life of the resulting compositions. Ketimines are typically formed by reacting a polyamine with a ketone. Limiting the amount of the polyamine in the final product is highly desirable since high levels of polyamines in the ketimines are detrimental to the pot-life when mixed with polyepoxides. The prior art is silent regarding ketimines wherein the content of polyamine is less than 1% by weight and the content of other impurities including trimers is less than 7.5% by weight and preferably less than 6% by weight. Therefore, there remains a long felt need for a process for making ketimines from the corresponding polyamines and ketones wherein the resulting ketimines have a polyamine content of less that 1% by weight and the content of other impurities including trimers is less than 6% by weight.

BRIEF DESCRIPTION OF THE FIGURE AND PROCESS

FIG. 1 illustrates the process equipment useful to make the ketimines of the present invention. As shown in FIG. 1, a reactor 1 is equipped with agitation means 3, jacket means 2 and internal coil 4. The reactor 1 is also fitted with a condenser 5 and a decanter 6. The decanter 6 has a line 9 backed to reactor 1 for recycling the ketone. When making the ketimines by the process of the present invention, the reactants are placed in reactor 1. Following the charge of reactants, the reaction mixture is heated and placed under reflux. During the reaction process, excess ketone and water condense and separate into a ketone 7 phase and water phase 8 inside decanter 6. The water produced during the process is removed through line 10 and the resulting ketimine once the process is completed is removed through line 11.

SUMMARY OF THE INVENTION

The present invention is directed to a method for the production of ketimines of the formula:

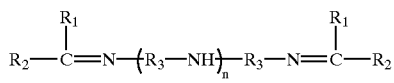

and having a unreacted polyamine content of less than 1% by weight and having the content of other impurities, including heavy ends which include trimer (the term "trimer" herein shall mean the product of three MIBK reacted with one DETA), of less than 6%, wherein $R_1$ and $R_2$ are selected from the group consisting of $C_1$–$C_{18}$ aliphatic including the branched isomers, $C_5$–$C_{10}$ cycloaliphatic, and $C_6$–$C_{12}$ aromatic hydrocarbons, and $R_3$ is a bivalent $C_1$–$C_{12}$ hydrocarbon and n is 0 to 6, which method comprises reacting a ketone of the formula:

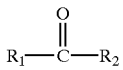

wherein $R_1$ and $R_2$ are as defined above, with an amine of the formula:

wherein $R_3$ and n are as defined above, at a temperature range of about 170° F. to about 230° F. and wherein the weight ratio of ketone to amine is in the range of about 3.0:1 to 10:1.

In another aspect, the present invention is directed to a method for the production of 2,4, 12,14-tetramethyl-5,8,11-triaza-4,11-pentadecadiene having a content of less than 1% by weight of diethylenetriamine, which method comprises reacting methyl isobutyl ketone with diethylenetriamine at a temperature range of about 170° F. to about 230° F., and wherein the weight ratio of methyl isobutyl ketone to diethylenetriamine is in the range of about 3.0:1 to about 10:1. In still another aspect of the present invention, the present invention is directed to a method for the production of a ketimine having a content of less than 1% by weight of ethylene diamine (EDA), which method compresses reacting methyl isobutyl ketone with EDA at a temperature range of about 170° F. to about 230° F., and wherein the weight ratio of methyl isobutyl ketone to ethylenediamine is in the range of about 3.0:1 to about 10:1.

The invention is also directed to a process for the production of a composition comprising aliphatic ketimines, having a polyalkylenepolyamine content of less than 1%, from the corresponding aliphatic ketones and polyalkylenepolyamines comprising the steps of: (a) forming a mixture of said aliphatic ketones and said polyalkylenepolyamines wherein the weight ratio of said ketone to said polyalkylenepolyamine is in the range of about 3.0:1 to about 10:1; (b) heating said mixture to a refluxing temperature between about 170° F. and 230° F. while continuously removing water to form the corresponding aliphatic ketimine; and (c) isolating said aliphatic ketimine. In a specific embodiment of the present invention, the ketimine prepared is a ketimine containing a secondary nitrogen atom with one hydrogen attached to the nitrogen.

The instant invention is further directed to a method for the production of 2,4,12,14-tetramethyl-5,8,11-triaza-4,11-pentadecadiene which method comprises: (a) forming a mixture of methyl isobutyl ketone and diethylenetriamine wherein the weight ratio of said methyl isobutyl ketone to said diethylenetriamine is in the range of about 3.0:1 to about 10:1; and (b) heating said mixture to a refluxing temperature between about 170° F. and 230° F. while continuously removing water to form the corresponding 2,4,12,14-tetramethyl-5,8,11-triaza-4,11-pentadecadiene and wherein said ketimine has a content of less than 1% by weight of diethylenetriamine.

The invention is also directed to a ketimine composition, specifically a composition comprising the compound 2,4, 12,14-tetramethyl-5,8,11-triaza-4,11-pentadecadiene having a diethylenetriamine content of less than 1% by weight and other impurities content, including trimers, of less than less than 6%.

DETAILED DESCRIPTION OF THE INVENTION

The process of the present invention can be generically represented by the reaction sequence illustrated in scheme 1.

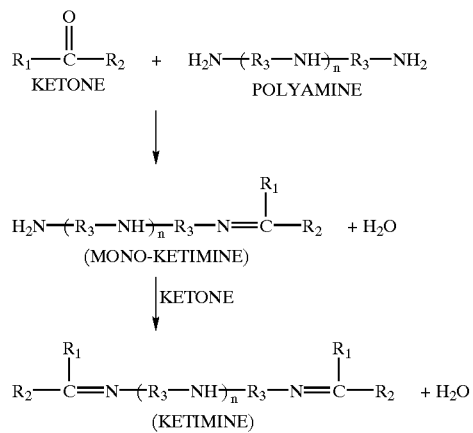

As shown in scheme 1 a ketone of the formula:

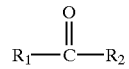

wherein $R_1$ and $R_2$ are selected from the group consisting of $C_1$–$C_{18}$ aliphatic hydrocarbons including the branched isomers, $C_5$–$C_{10}$ cycloaliphatic, and $C_6$–$C_{12}$ aromatic hydrocarbons is reacted with a polyamine of the formula:

wherein $R_3$ is a bivalent $C_1$–$C_{12}$ hydrocarbon and n is 0 to 6 to produce a ketimine curing agent of the formula:

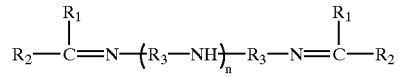

wherein $R_1$, $R_2$ and $R_3$ are as defined above and wherein said ketimine has a polyamine content of less than 1% by weight, and other impurities including heavy ends of less than 6%. As used herein, the term "other impurities" means the impurities in the reaction product stream other than MIBK, polyamines and the desired ketimine. In other words, the weight % of the other impurities equals 100%–(MIBK wt % +DETA wt % +ketamine wt %). In a specific embodiment of the present invention, n is 1–6 and the ketimine formed contains a secondary amine nitrogen with one hydrogen attached.

The preferred ketones are selected from the group consisting acetone, methyl ethyl ketone, methyl propyl ketone, methyl isopropyl ketone, methyl butyl ketone, methyl isobutyl ketone, methyl-n-amyl ketone, methyl isoamyl ketone, methyl heptyl ketone, diethyl ketone, ethyl butyl ketone, ethyl amyl ketone, diisopropyl ketone, diisobutyl ketone, cyclohexanone, cyclopentanone, methyl cyclohexanone, isophorone, methyl-tert.-butyl ketone, 5-methyl-3-heptanone, 4-heptyl ketone, 1-phenyl-2-propanone, acetophenone, methyl nonyl ketone, dinonyl ketone, 3,3,5-trimethyl cyclohexanone.

Preferred ketones are those which have a boiling point below 338° F. and which are readily volatile at room temperature. Particularly preferred ketones are methyl isobutyl ketone, methyl isopropyl ketone, diethyl ketone, diisobutyl ketone, methyl tert.-butyl ketone. It is of course also possible to use mixtures of aforementioned ketones.

The preferred polyamines are selected from the group consisting of ethylenediamine, propylenediamine, tetramethylenediamine, diethylenetriamine, triethylenetetramine, tetraethylenepentamine, dipropylenetriamine and tripropylene-tetraamine and mixtures thereof. Other polyamines useful in the process of the present invention isophoronediamine, bis-(4-aminocyclohexyl)-methane, bisamino-methyl hexahydro-4,7-methane indane, 1,4-cyclohexanediamine, 1,3-cyclohexane diamine, 2-methyl cyclohexanediamine, 4-methyl cyclohexanediamine, 2,2,5-trimethyl hexanediamine, 2,2,4-trimethyl hexanediamine, 1,4-butanediol-bis-(3-aminopropyl)-ether, 2,5-diamino-2,5-dimethyl hexane, bisaminomethyl cyclohexane, bis-(4-amino-3,5-dimethyl cyclohexyl)-methane or mixtures thereof and the like.

The reaction of the ketone and the polyamine is typically carried out at a temperature range of about 170° F. to about 230° F., preferably at a temperature range of about 185° F. to about 215° F. and more preferably at a temperature range of about 190° F. to about 200° F. A temperature range of 190° F. to about 200° F. is particularly preferred to minimize the formation of other impurities including the heavy ends such as trimer of the ketimine.

Upon reaching the temperature range mentioned above for the reaction of the polyamine with ketone, the batch temperature is maintained at that range and vacuum is applied for reflux. The vacuum conditions vary from 15–29 inch Hg, preferably 20–29 inch Hg and more preferably 25–28 inch Hg.

The process further comprises the steps of removing the ketones under a vacuum of from about 15 to about 29 inch Hg at a temperature of from about 5 to about 15° F. higher than the reaction temperature, after the polyalkylene polyamine content is less than 1% by weight.

The reaction is carried out in such a way so as to remove the water of reaction until the calculated quantity (approx. 1 mole water per mole primary amino groups) has been eliminated or until the elimination of water stops. The excess ketone and any unreacted starting materials still present are then removed by distillation. In a preferred embodiment, the excess ketone is recycled into the reaction mixture. As much as 50% of the ketone can be recycled when using the process of the present invention. The crude products thus obtained may be used without further purification as curing agents.

The weight ratio of ketone to polyamine is typically in the range of about 3:1 to about 10:1, preferably in the range of about 3:1 to about 7:1 and more preferably in the range of about 4.0:1 to about 6.0:1.

By careful control of process temperature, and the weight ratio of reactants, the formation of high molecular weight impurities (heavy ends including trimers) is minimized. The other impurity content, including the heavy ends which includes the trimers, is limited to less than 7.5%, preferably less than 7%, and more preferably less than 6%, and still more preferably less than 5%, and still much more preferably less than 4% by the process of the present invention.

The process of the present invention is carried out in a reactor as shown in FIG. 1 equipped with a decanter (or accumulator) that has a line (at upper area) backed to the reactor since the refluxed ketone needs to be returned to the kettle to complete the desired reaction. After the reaction, the excess ketone is then permanently stripped out. An overhead condenser with efficient cooling or a set of separator with a decanter is required for better phase separation between refluxed ketone and reaction water, only ketone needs to be returned to the reactor, reaction water is then drained out.

Typical ketimines which can be prepared by the method of the present invention include:
2,4,9,11-tetramethyl-5,8-diaza-4,8-dodecadiene
2,4,12,14-tetramethyl-5,8,11-triaza-4,11-pentadecadiene
4,7,10-triaza-3,10-tridecadiene
3,11,-dimethyl-4,7,10-triaza-3,10-tridecadiene
4,13-disiopropyl-5,8,12-triaza-4,12-heptadecadiene
3,11,dicyclohexenyl-4,7,10-triaza-3,10-tridecadiene
7,10,13-triaza-6,13-nonadecadiene
3,11,diallyl-4,7,10-triaza-3,10-tridecadiene
4,13-dicyclopentyl-5,8,12-triaza-4,12-heptadecadiene The ketimines produced by the process of the present invention typically have less than 1% unreacted polyamine, preferably less than 0.8% polyamine and most preferably less than 0.5%. Also the other impurity content of the ketimines is also less than 7.5%, preferably less than 7.0%, more preferably less than 6%, and still more preferably less than 5%, and still more preferably less than 4%.

In a particular preferred embodiment, an improved process for making 2,4,12,14-tetramethyl-5,8,11-triaza-4,11-pentadecadiene is shown in scheme II.

As shown in scheme II, 2,4,12,14-tetramethyl-5,8,11-triaza-4,11-pentadeca-diene is prepared by reacting diethylenetriamine (DETA) with methyl isobutyl ketone (MIBK). An excess molar charge ratio of MIBK to DETA is required to drive the reaction to completion. Since the reaction is reversible, the water generated during the reaction between MIBK with DETA must be removed during the reaction to get the reaction to go to completion. The distillate removed during the reaction is condensed and the water and MIBK phases separate. The water phase is drained out, while MIBK phase is continuously decanted back into the reactor. Following the reaction step, the excess MIBK is stripped out under vacuum. The resulting ketimine composition produced has a free DETA content of less than 1.0% and impurity content, including tri-substituted species (trimers) of less than 7.5%, preferably less than 7%, more preferably less than 6%, and still more preferably less than 5%, and still more preferably less than 4% as measured by Gas Chromatography (GC).

In the improved process for making 2,4,12,14-tetramethyl-5,8,11-triaza-4,11-pentadecadiene the charge ratio of MIBK/DETA is typically in the range of about 10/1 to 3/1 percent by weight and preferably about 7/1 to 3/1 percent by weight and more preferably in the range of 4.0/1 to 6.0/1 percent by weight in order to increase batch yield. The improved process also recycles the MIBK from previous production in order to reduce manufacturing cost.

As one illustrative, but by no means limiting examples of the present process for making 2,4,12,14-tetramethyl-5,8,11-triaza-4,11-pentadecadiene a ketimine having the properties shown in Table 1 is made.

TABLE 1

| Property | Target Ranges* |
| --- | --- |
| Color, Gardner | 5 max. |
| Brookfield Cone & Plate Viscosity at 25° C., cP | 4–7 |
| Amine Nitrogen, % wt | 13.3–14.6 |
| Free DETA, area % (by GC Method) | 1 max. |
| Typical Property | |
| MIBK, area % (by GC method) | 8–15 |
| Others**, area % (by GC Method) heavy ends | 6 max. |
| Ketimine***, area % (by GC Method) | 78 min. |

*Viscosity and total nitrogen depend on amount of MIBK in the finished product.
**Others = 100% - (MIBK % + DETA % + KETIMINE %)
***Ketimine means the compound with the desired structure of di-MIBK/DETA.

SCHEME II

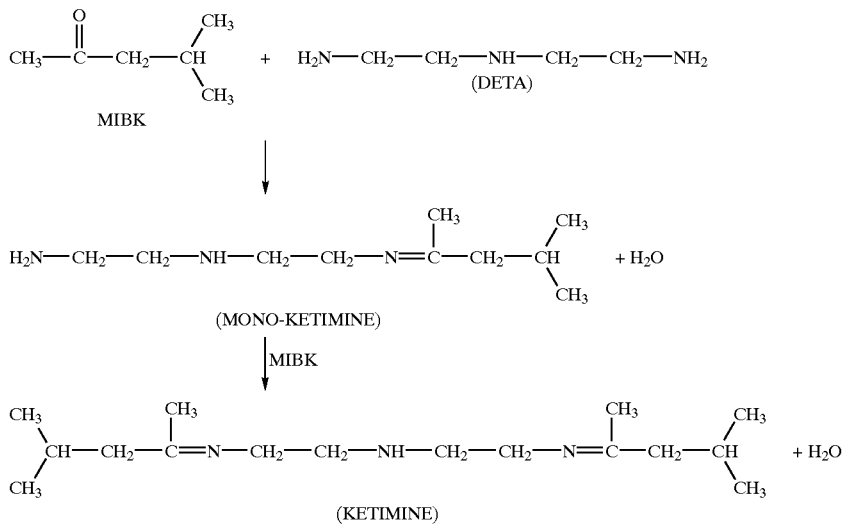

The higher purity Ketimine Curing Agent having a free DETA content of less than 1.0% and other impurity content, including tri-substituted species (trimers), of less than 6% (by GC) are particularly useful in special curing applications where the unreacted DETA content and the trimer content would adversely affect the pot life of the intended compositions.

As a preferred embodiment of the present invention, to make 2,4,12,14-tetramethyl-5, 8,11-triaza-4,11-pentadecadiene with higher purity, the temperature and process time ranges are adjusted for optimum results. The following reaction conditions are preferred in making the ketimine:

1. Lower temperature to 195–200° F. and applying vacuum during reflux step.
2. Sample before MIBK stripping to ensure both free DETA and undesired trimers are low enough.
3. Raise temperature by about from about 5 to about 25° F., specifically from about 8 to about 15 F. and more specifically from about 8.5 to about 12° F. to reach from 180° F. to about 240° F., preferably from about 190° F. to about 220° F., more preferably from about 200° F. to about 210° F. during MIBK stripping under a vacuum of from about 15 to about 29 inch Hg, more preferably from about 20 to about 29 inch Hg, and still more preferably from about 25 to about 28 inch Hg. (Note: Full vacuum is 30 inch Hg) Allow more MIBK (as high as 15% wt) left in the finished ketimine. This change is done to minimize trimmer formation during MIBK stripping.

The 2,4,12,14-tetramethyl-5,8,11-triaza-4,11-pentadecadiene prepared according to the method of the present invention typically has less than 0.9% by weight diethylenetriamine, preferably less than 0.8% by weight diethylenetriamine, more preferably less than 0.7% by weight diethylenetriamine, and most preferably less than 0.5% by weight diethylenetriamine.

The ketimine curing and cross-linking agents prepared according to the method of the present invention may be employed in the usual amounts in all curable coating, impregnating, sealing and bonding compositions in which the well-known ketimine curing and cross-linking agents were already used or could be used, said composition containing a functional resin having as functional groups, for instance, anhydride, epoxy, isocyanate, acetoacetate and α,β-ethylenically unsaturated carbonyl groups. It is preferred that said composition should contain the present curing and cross-linking agent in such an amount that ¼–4 equivalents of primary (ketiminized) amino groups are present per equivalent of the functional groups of the functional resin. In addition, these compositions may still contain organic solvents, usually employed in the paint industry, such as the aliphatic or aromatic hydrocarbons, esters, ethers, alcohol's, ketones and ether acetates and/or the usual additives, such as pigments, fillers, leveling agents, foam suppressing agents, rheology controlling agents, catalysts such as organic carboxylic acids, anti-oxidants, UV-stabilizers, and sag-control agents. In these compositions the present curing and cross-linking agents display curing properties similar to those of the well-known ketimines, but they are superior to them in that they have superior pot-life and a lower Gardner colour rating, which is maintained during storage.

A particularly important application of the higher purity ketimines of the present invention is in the coatings industry wherein a refinishing primer having longer pot life is desirable.

BEST MODE FOR CARRYING OUT THE INVENTION

The following examples will more fully illustrate the embodiments of this invention. Therefore, they should not be construed as limiting of the remainder of the disclosure in any way. All parts, percentage and proportions referred to herein and in the appended claims are by weight unless otherwise indicated.

EXAMPLE 1

General Procedure For Making Ketimines

1. Charge the desired amount of ketone into the reaction kettle and start the agitator.
2. Charge the calculated amount of polyamine. The polyamine can be added while charging the ketone.
3. Deaerate the batch kettle with nitrogen using a $N_2$ flow rate of 2–5 CFM.
4. Heat the batch to 180–210° F. Apply vacuum. Hold the batch at 180–210° F. under full vacuum for reflux. Temperature control is highly desirable to minimize trimers formation.

5. Open the kettle to the overhead system and begin boiling and condensing.

6. Collect the reaction water in the decanter. Return condensed ketone back to the kettle. After reacting at 180–210° F. two hours, drain the water from the decanter. Record drain weights. The temperature control at this step is highly desirable. High temperature would impact product yield due to amine loss and increase trimer contents. Low temperature would increase cycle time for removing water.

7. When the collected water is above 70% wt of the theoretical amount of reaction water, take a sample from the kettle for GC analysis.

8. If the polyamine content is higher than 0.7% by GC analysis, continue reflux until the polyamine content is lower than 0.7% or add additional fresh ketone if polyamine content doesn't drop after two consecutive samples.

9. Heat the batch to 195–215° F. to evaporate off excess ketone.

10. Once ketone distillation is slow, sample for ketone content in the ketimine. May apply vacuum (target at 25–30" Hg). Adjust batch temperature to 215° F. or less under 25–30" Hg vacuum until the ketone content is between 8–15% by GC analysis. Control batch temperature at 220° F. maximum. High temperature may form more trimer-type of by-product.

11. If ketone content is less than 15% wt, cool the batch to below 145° F.

12. The resulting product is then filtered to remove particulates.

EXAMPLE 2

(a) Using the general procedure outlined in Example 1, under a nitrogen atmosphere 1.5 moles of dipropylene triamine, 3.3 moles of pentanone-3, were charged into the reaction vessel and heated to boiling point, the water evolved being removed by azeotropic distillation. After about 10 hours 53.9 g of water (99,8% of the theoretical amount) had been collected. The resulting solution was cooled to 140° F. and filtered.

(b) The same procedure as in (a) was used for preparing the diketimines of di-propylenetriamine and respectively, heptanone-3 and 5-methylheptanone-3, the diketimines of N,N'-bis(3-aminopropyl)-1,2-diaminoethane and, respectively, 5-methylheptanone-3 and pentanone-3, the ketimine of N-methyl-1,3-diaminopropane and 5-methylheptanone-3 and the ketimine of N-cyclohexyl-1,3-diaminopropane and octanone-3.

EXAMPLE 3

(a) To 708.4 g of the diketimine prepared in accordance with Example IIa was added a solution in 162.0 g of toluene of 378 g of a diglycidyl ether of Bisphenol A (available under the trade mark Epikote 828 of Shell Chemical) over a period of 2 hours at 80° C. This reaction mixture was kept at a temperature of 100° C. for 3 hours. Subsequently, 272,5 g of n-butanol were added and the mixture was cooled and stored. Both initially and after 6 weeks' storage at 50° C. the colour of the end product was <3 by the Gardner scale.

(b) To 930.5 g of the diketimine prepared in accordance with Example IIa were added 282 g of butane diol-1,4-glycidyl ether (available under the trade mark Grilonit RV 1806 of EMS-Chemie AG). This reaction mixture was kept at 100° C. for 3 hours. Subsequently, 193.3 g of n-butanol was added and the mixture was cooled and stored. Both initially and after 6 weeks' storage at 50° C. the colour of the end product was <3 by the Gardner scale.

EXAMPLE 4

Preparation Of 2,4,12,14-Tetramethyl-5,8,11-Triaza-4,11-Pentadecadiene

1. Charge 2,777.2 gms of methyl isobutyl ketone into the reaction kettle and start the agitator.

2. Charge 694.3 gms of diethylenetriamine (amine value 1562–1633 mg KOH/g). The diethylenetriamine can be added while charging the methyl isobutyl ketone.

3. Deaerate the batch kettle with nitrogen using a $N_2$ flow rate of 2–5 CFM.

4. Heat the batch to 190–200° F. Apply vacuum. Hold the batch at 190–200° F. under full vacuum for reflux. Temperature control is highly desirable to minimize trimers formation.

5. Open the kettle to the overhead system and begin boiling and condensing.

6. Collect the reaction water in the decanter. Return condensed ketone back to the kettle. After reacting at 190–200° F. for two hours, drain the water from the decanter. Record drain weights. The temperature control at this step is highly desirable. High temperature would impact product yield due to amine loss and increase trimer contents. Low temperature would increase cycle time for removing water.

7. When the collected water is above 70% wt of the theoretical amount of reaction water, take a sample from the kettle for GC analysis.

8. If the diethylenetriamine content is higher than 0.7% by GC analysis, continue reflux until the diethylenetriamine content is lower than 0.7% or add additional fresh methyl isobutyl ketone if polyamine content doesn't drop after two consecutive samples.

9. Heat the batch to 200–210° F. to evaporate off excess methyl isobutyl ketone.

10. Once methyl isobutyl ketone distillation is slow, sample for methyl isobutyl ketone content in the ketimine. May apply vacuum (target at 28–30" Hg). Adjust batch temperature to 210° F. or less under 28–30" Hg vacuum until the methyl isobutyl ketone content is between 8–15% by GC analysis. Control batch temperature at 220° F. maximum. High temperature may form more trimer-type of by-product.

11. If methyl isobutyl ketone content is less than 15% wt, cool the batch to below 130° F.

12. The resulting product is then filtered to remove particulates.

EXAMPLE 5

(a) Using the same procedure as in Example 4 except the ratio of methyl isobutyl ketone to diethylenetriamine is 6:1.

(b) Using the same procedure as in Example 4 except the ratio of methyl isobutyl ketone to diethylenetriamine is 6:1.

(c) Using the same procedure as in Example 4 except the ratio of methyl isobutyl ketone to diethylenetriamine is 6:1.

(d) Using the same procedure as in Example 4 except the ratio of methyl isobutyl ketone to diethylenetriamine is 6:1.

The properties of the 2,4,12,14-tetramethyl-5,8,11-triaza-4,11-pentadeca-diene obtained as a result of Example 4 and Examples 5(a)–5(d) are summarized in Table 2.

TABLE 2

Data on 2,4,12,14-tetramethyl-5,8,11-triaza-4,11-pentadecadiene

| Property | Example 4* | Example 5a** | Example 5b** | Example 5c** | Example 5d** |
|---|---|---|---|---|---|
| Total N, % wt | 15.0 | 13.9 | 13.6 | 14.4 | 14.1 |
| Viscosity at 25° C., cp | 7.1 | 5.1 | 4.5 | 5.5 | 4.7 |
| Gardner color | 2 | 1 | 2 | 2 | 2 |
| GC Analysis on Produ Composition, % area | | | | | |
| MIBK | 3.9 | 12 | 16.5 | 8.1 | 13.8 |

TABLE 2-continued

Data on 2,4,12,14-tetramethyl-5,8,11-triaza-4,11-pentadecadiene

| Property | Example 4* | Example 5a** | Example 5b** | Example 5c** | Example 5d** |
|---|---|---|---|---|---|
| DETA | <1.0 | 0 | 0.3 | 0.5 | 0.6 |
| Others | 6.9 | 5.2 | 5.2 | 3.4 | 2.3 |
| KETIMINE CONTENT | 89.2 | 81.8 | 78 | 88 | 83.3 |

Note:
*Example 4 was made with 50% of recycled MIBK. Basis on GC analysis, the recycled MIBK contains 99.4% of MIBK, 0.6% of others and <0.1% of ketimine; water in the MIBK is 2.2%, MIBK/DETA ratio is 4/1 by weight.
**Examples 5a–5d using 100% of fresh MIBK as a MIBK/DETA ratio of 6/1 by weight.

EXAMPLE 6

Preparation Of 2,4,9,11-Tetramethyl-5,8-Diaza-4,8-Dodesadiene

1. Charge 567.6 gms of methyl isobutyl ketone into the reaction kettle and start the agitator.
2. Charge 141.8 gms of ethylenediamine (amine value 5.92 meq/g ). The ethylenediamine can be added while charging the methyl isobutyl ketone.
3. Deaerate the batch kettle with nitrogen using a $N_2$ flow rate of 2–5 CFM.
4. Heat the batch to 190–220° F. Apply vacuum. Hold the batch at 190–220° F. under full vacuum for reflux. Temperature control is highly desirable to minimize trimers formation.
5. Open the kettle to the overhead system and begin boiling and condensing.
6. Collect the reaction water in the decanter. Return condensed ketone back to the kettle. After reacting at 190–220° F. for two hours, drain the water from the decanter. Record drain weights. The temperature control at this step is highly desirable. High temperature would impact product yield due to amine loss and increase trimer contents. Low temperature would increase cycle time for removing water.
7. When the collected water is above 70% wt of the theoretical amount of reaction water, take a sample from the kettle for GC analysis.
8. If the ethylenediamine content is higher than 0.7% by GC analysis, continue reflux until the ethylenediamine content is lower than 0.7% or add additional fresh methyl isobutyl ketone if polyamine content doesn't drop after two consecutive samples.
9. Heat the batch to 200–210° F. to evaporate off excess methyl isobutyl ketone.
10. Once methyl isobutyl ketone distillation is slow, sample for methyl isobutyl ketone content in the ketimine. May apply vacuum (target at 28–30" Hg). Adjust batch temperature to 210° F. or less under 28–30" Hg vacuum until the methyl isobutyl ketone content is between 8–15% by GC analysis. Control batch temperature at 220° F. maximum. High temperature may form more trimer-type of by-product.
11. If methyl isobutyl ketone content is less than 15% by weight, cool the batch to below 130° F.
12. The resulting product is then filtered to remove particulates.

EXAMPLE 7

This example describes the preparation of an adduct of methyl isobutyl ketone (MIBK) and 2-methyl-1,5-pentanediamine. A one-liter reactor was charged with 2-methyl-1,5-pentanediamine (300 g, 2.6 mol) and methyl isobutyl ketone (260 g, 2.6 mol). The reactor was sealed and the air in the reactor removed by three pressure/vent cycles with nitrogen. The reaction mixture is then refluxed at 195° to 205° F. until the amount of water close to the theoretical value is removed.

From the foregoing description, one skilled in the art can easily ascertain the essential characteristics of this invention. A further understanding of the nature and advantage of this invention herein may be realized by reference to the remaining portions of the specification and the appended claims. Also it is to be understood that the forms of the invention herein are to be taken as preferred examples of the same and that various changes may be made without departing from the spirit of the invention or scope of the subjoined claims.

I claim:

1. A method for the production of ketimines of the formula:

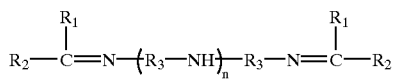

having an unreacted polyamine content of less than 1% by weight, wherein $R_1$ and $R_2$ are selected from the group consisting of $C_1$–$C_{18}$ aliphatic, including the branched isomers, $C_5$–$C_{10}$ cycloaliphatic, and $C_6$–$C_{12}$ aromatic radicals, $R_3$ is a bivalent $C_1$–$C_{12}$ hydrocarbon and n is 0 to 6; which method comprises:

a) contacting a ketone of the formula:

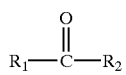

wherein $R_1$ and $R_2$ are as defined above, with a polyamine of the formula

wherein $R_3$ is as defined above, at a temperature range of about 170° F. to about 230° F.,
wherein the weight ratio of ketone to amine is in the range of about 3.0:1 to 10:1, to form a reaction mixture having an excess of ketone reactant;
b) removing a water by-product produced in the reaction mixture;
c) removing the excess of ketone reactant from the reaction mixture;
d) recycling a portion of the excess of ketone reactant to the reaction mixture; and
e) recovering a ketimine product.

2. The method of claim 1 wherein $R_1$ and $R_2$ in said ketone is selected from the group consisting of n-$C_1$–$C_8$, s-$C_1$–$C_8$ and t-$C_1$–$C_8$ aliphatic hydrocarbon groups.

3. The method of claim 1 wherein $R_3$ in said polyamine is an aliphatic radical having 1–4 carbon atoms and n is 1–6.

4. The method of claim 2, wherein said ketone is selected from the group consisting of acetone, methyl ethyl ketone, methyl propyl ketone, methyl isopropyl ketone, methyl butyl ketone, methyl isobutyl ketone, methyl-n-amyl ketone, methyl isoamyl ketone, methyl heptyl ketone, diethyl ketone, ethyl butyl ketone, ethyl amyl ketone, diisopropyl ketone and diisobutyl ketone and mixtures thereof.

5. The method of claim 3 wherein said polyamine is selected from the group consisting of ethylenediamine, propylenediamine, tetramethylenediamine, diethylenetriamine, triethylenetetramine, tetraethylenepentamine, dipropylenetri-amine and tripropylenetetraamine and mixtures thereof.

6. The method of claim 1 wherein the process further comprises the steps of removing the ketones under a vacuum of from about 15 to about 29 inch Hg at a temperature of from about 5 to about 15° F. higher than the reaction temperature, after the polyalkylene polyamine content is less than 1% by weight.

7. The method of claim 1 wherein said reaction temperature is in the range of about 190° F. to about 200° F.

8. The method of claim 4 wherein said ketone is methyl isobutyl ketone.

9. The method of claim 5 wherein said polyamine is diethylenetriamine.

10. The method of claim 1, wherein the weight ratio of ketone to polyamine is in the range of 3:1 to 7:1.

11. The method of claim 1, wherein weight ratio of ketone to polyamine is in the range of from 3.5:1 to 10:1.

12. The method of claim 1, wherein weight ratio of ketone to polyamine is in the range of from 4:1 to 7:1.

13. The method of claim 1, wherein weight ratio of ketone to polyamine is in the range of from 3:5:1 to 4.5:1.

14. The method of claim 1, wherein the reaction temperature ranges from 185° C. to 215° C.

15. The method of claim 1, wherein said ketimines have an unreacted polyamine content of less than 0.9 wt. %.

16. The method of claim 1, wherein said ketimines have an unreacted polyamine content of less than 0.8 wt. %.

17. The method of claim 16, wherein said ketimines have an unreacted polyamine content of less than 0.5 wt. %.

18. The method of claim 1, wherein said ketimines have less than 7.5 wt. % of other impurities.

19. The method of claim 18, wherein said ketimines have less than 6 wt. % of other impurities.

20. The method of claim 19, wherein said ketimines have less than 5 wt. % of other impurities.

21. The method of claim 1, wherein the color of the ketimines are less than 3 by the Gardner scale.

22. The method of claim 1, wherein said ketimines comprise 2,4,12,14-tetramethyl-5,8,11-triaza-4,11-pentadecadiene having a diethylenetriamine content of less than 1% by weight.

23. The method of claim 1, wherein said ketimines consists essentially of 2,4,12,14-tetramethyl-5,8,11-triaza-4,11-pentadecadiene having a diethylenetriamine content of less than 1% by weight.

* * * * *